United States Patent
Nilsson

(10) Patent No.: US 9,565,368 B2
(45) Date of Patent: Feb. 7, 2017

(54) ENHANCED VIDEO CAPTURE IN ADVERSE LIGHTING CONDITIONS

(71) Applicant: Sony Mobile Communications Inc., Tokyo (JP)

(72) Inventor: Jan Nilsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/727,907

(22) Filed: Jun. 2, 2015

(65) Prior Publication Data
US 2016/0360083 A1    Dec. 8, 2016

(51) Int. Cl.
| | |
|---|---|
| H04N 5/228 | (2006.01) |
| H04N 5/222 | (2006.01) |
| G03B 15/03 | (2006.01) |
| H04N 5/235 | (2006.01) |
| H04N 5/225 | (2006.01) |
| H04N 5/265 | (2006.01) |

(52) U.S. Cl.
CPC .......... *H04N 5/2354* (2013.01); *H04N 5/2256* (2013.01); *H04N 5/265* (2013.01)

(58) Field of Classification Search
CPC .. H04N 5/2354; H04N 5/2256; H04N 5/2351; H04N 2101/00; H04N 5/23245; H04N 1/00307; H04N 5/23212; H04N 1/2112; G02B 23/2461; A45D 33/32; G03B 15/03; G03B 15/05; G03B 2215/0532; G03B 15/02
USPC .............. 348/176, 222.1, 370, 371; 382/118; 396/155, 176
See application file for complete search history.

(56) References Cited

U.S. PATENT DOCUMENTS

| | | | |
|---|---|---|---|
| 2005/0190288 A1* | 9/2005 | Yamada | H04N 5/2354 348/371 |
| 2007/0263099 A1 | 11/2007 | Motta | |
| 2008/0106636 A1* | 5/2008 | Wernersson | H04N 5/2354 348/371 |
| 2009/0175555 A1* | 7/2009 | Mahowald | H04N 5/23232 382/274 |
| 2011/0205395 A1 | 8/2011 | Levy | |
| 2012/0314103 A1 | 12/2012 | Majewicz | |
| 2015/0130958 A1 | 5/2015 | Pavani | |

OTHER PUBLICATIONS

International Search Report and Written Opinion dated Mar. 24, 2016 for corresponding International Application No. PCT/IB2016/050108.

* cited by examiner

*Primary Examiner* — Trung Diep
(74) *Attorney, Agent, or Firm* — Renner, Otto, Boissell & Sklar, LLP.

(57) ABSTRACT

A device and method of capturing a video frame using an electronic device to provide enhanced video. A first sub-frame is captured using ambient light, and a second sub-frame is captured using ambient light and a light source under control of the electronic device. A primary frame is generated based on a combination of the first sub-frame and the second sub-frame.

16 Claims, 3 Drawing Sheets

ENHANCED VIDEO CAPTURE IN ADVERSE LIGHTING CONDITIONS

TECHNICAL FIELD OF THE INVENTION

The technology of the present disclosure relates generally to electronic devices and, more particularly, to techniques for enhancing video capture in low light conditions.

BACKGROUND

Electronic devices, such as cameras, smart phones, tablets, lap tops, and the like, include a camera function for capturing video clips. In favorable lighting conditions, additional illumination typically is not needed to obtain a good-quality video. However, when capturing video during low-light conditions, e.g., in-doors or during a cloudy/overcast day, the ambient light may be less than optimal and this can result in less than optimal video quality.

To compensate for less than ideal lighting conditions, most electronic devices include an auxiliary light source (e.g., an LED light source) to provide additional light during video capture. While such light source can improve the quality of the captured video, it can have drawbacks. For example, when using the auxiliary light source foreground features captured in the video may be enhanced relative to foreground features captured in video capture without the auxiliary light source. However, the background features captured using the auxiliary light source may not be enhanced, and in most cases the background features are darker than what would be captured without the auxiliary light source. Also, use of the light source may cause subjects in the video to squint, which is undesirable.

SUMMARY

In accordance with the present disclosure, an electronic device and method are provided for enhancing video captured during low light conditions. To provide enhanced video, one of two successive sub-frames is captured using ambient light and the other of the two successive frames is captured using ambient light in combination with light generated from a light source (e.g., an LED light of the electronic device). A single frame (referred to as a primary frame) then is generated based on analysis of the two successive sub-frames. This process is repeated for each successive primary frame to produce a continuous video in real time.

According to one aspect of the disclosure, a method of capturing a video frame using an electronic device includes: capturing a first sub-frame using ambient light; capturing a second sub-frame using ambient light and a light source under control of the electronic device; and generating a primary frame based on a combination of the first sub-frame and the second sub-frame.

According to one aspect of the disclosure, an electronic device includes: a camera; a light source; and a control circuit operative to generate a video, the control circuit configured to capture a first sub-frame using ambient light, capture a second sub-frame using ambient light and the light source of the electronic device, and generate a primary frame based on a combination of the first sub-frame and the second sub-frame.

To the accomplishment of the foregoing and the related ends, the device and method comprises the features hereinafter fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

DETAILED DESCRIPTION OF EMBODIMENTS

Figure 1A:
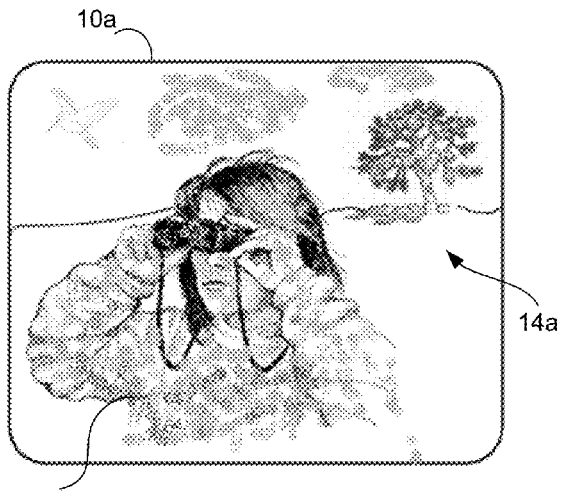
FIG. 1A illustrates an exemplary video frame of a subject captured using low-level ambient light.

Embodiments will now be described with reference to the drawings, wherein like reference numerals are used to refer to like elements throughout. It will be understood that the figures are not necessarily to scale. Also, features that are described and/or illustrated with respect to one embodiment may be used in the same way or in a similar way in one or more other embodiments and/or in combination with or instead of the features of the other embodiments.

The embodiments will be described in the context of an electronic device embodied as a mobile phone. It will be understood, however, that principles in accordance with the present disclosure are not limited to mobile phones, and may be applied to other electronic devices including, but not limited to, lap top computers, tablet computers, cameras, smart watches, or any portable electronic device that employs a video capture function.

The present disclosure describes a device and method for enhancing video captured via a camera of the electronic device during low light conditions. In this regard, the video comprises a plurality of primary frames, where each primary frame is generated from a series of sub-frames (e.g., two) that have been captured in succession. One of the sub-frames (e.g., a first sub-frame) is captured using the available ambient light. For example, the first sub-frame is captured without using an auxiliary light source (e.g., without using the auxiliary light source of the electronic device). Subsequent to capturing the first sub-frame, a second sub-frame is captured using the available ambient light as well as the auxiliary light source.

The auxiliary light source may be any light source used to provide lighting for video capture. In one embodiment, the auxiliary light source is integrated within the electronic device. In another embodiment, the auxiliary light source is separate from the electronic device. In both embodiments, however, the auxiliary light source is under the control of the electronic device so as to provide the proper timing for the respective frames.

Preferably, the auxiliary light source is embodied as an LED light source that is integrated with the electronic device. The auxiliary light source can be controlled by the electronic device so as to be synchronized with the capture of the second frame. In this regard, the auxiliary light source is pulsed on and off at a frequency based on the sample rate of the video capture. For example, if the video is captured at 120 fps (frames per second), where one frame is captured using ambient light and the other frame is captured using both ambient light and light generated by the auxiliary light source, then the auxiliary light source will need to be pulsed on and off every other frame (i.e., 60 times per second for the present example). The auxiliary light source may be enabled during the entire capture period of the second frame, or only for a portion of the capture period. Preferably, the auxiliary light source is enabled for only a portion of the capture period. It may be advantageous to capture video at a predetermined frame rate that minimizes detection of the pulsing light by the human eye. Such frequency may be 60 fps or greater, which would provide a light pulse 30 times per second.

Figure 1B:
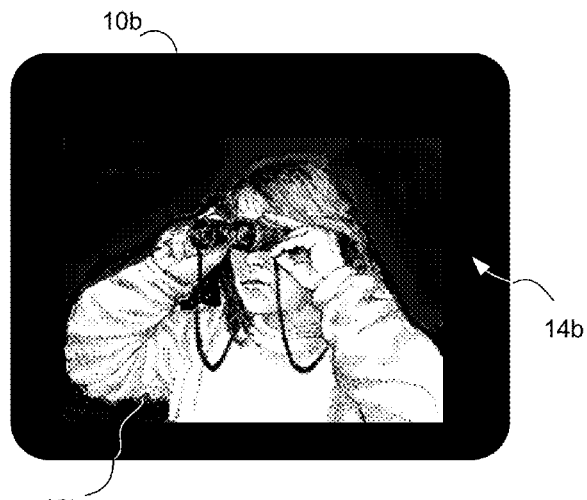
FIG. 1B illustrates an exemplary video frame of the subject of FIG. 1A using low-level ambient light and light from an auxiliary light source.

Upon capturing the first and second sub-frames, the pixel data for the respective sub-frames are compared to determine which have the greatest luminance. For example, when obtaining a sub-frame image in low-light conditions using ambient light (i.e., without the use of the auxiliary light source), an image may be captured that shows both foreground and background portions, but the foreground and background portions may be dim and/or may produce only a dark silhouette of the objects. This is shown in FIG. 1A, which represents a first sub-frame 10a obtained in a low light condition. As shown, both a foreground portion 12a and a background portion 14a are visible, but they both may tend to lack color vividness (not shown) and/or overall image brightness (represented by the dark portions on the subject's shirt and face). In contrast, when obtaining a sub-frame using the auxiliary light source the foreground portion tends to be vivid and bright, while the background portion is substantially lost. FIG. 1B shows such scenario (in an extreme case), where the foreground portion 12b of a second sub-frame 10b is bright and clear, and the background portion 14b is lost (i.e., it appears as a black image).

Figure 2:
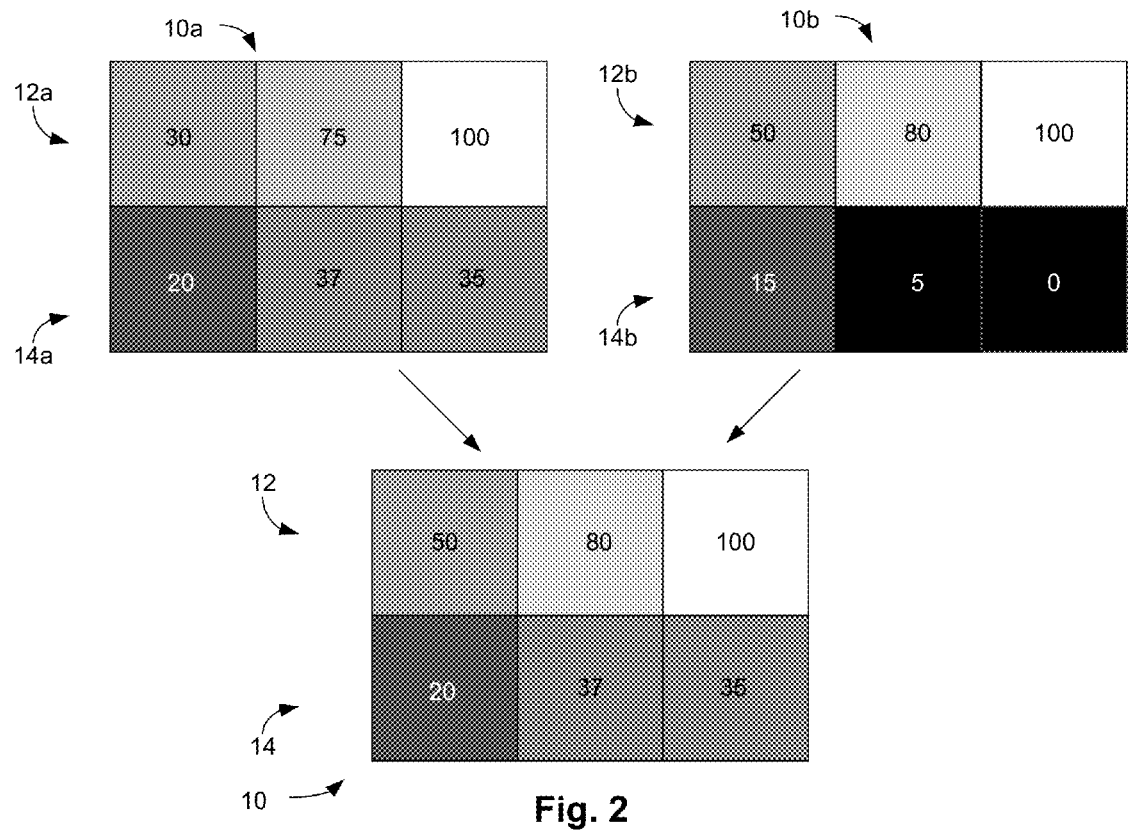
FIG. 2 illustrates a sample of pixels from the first sub-frame and the second sub-frame in accordance with the present disclosure.

To determine which pixels have the highest luminance, each pixel from the first sub-frame 10a can be compared to the corresponding pixel in the second sub-frame 10b. For example, the comparison can focus on a luminance of each respective pixel and the pixel with the higher luminance can be flagged. FIG. 2 illustrates six exemplary pixels from the first sub-frame 10a and six exemplary pixels from the second sub-frame 10b for the same object at a transition between the foreground and background portions, where the number within each pixel represents the luminance of that pixel. As can be seen, the foreground pixels 12b for the second sub-frame 10b have a higher luminance value than the corresponding pixels in the foreground 12a of the first sub-frame 10a. Consequently, the foreground pixels 12b of the second sub-frame 10b are flagged for use in the primary frame 10. Similarly, the background pixels 14a for the first sub-frame 10a have a higher luminance value than the corresponding pixels in the background 14b of the second sub-frame 10b. Thus, the background pixels 14a of the first sub-frame 10a are flagged for use in the primary frame 10.

Figure 1C:
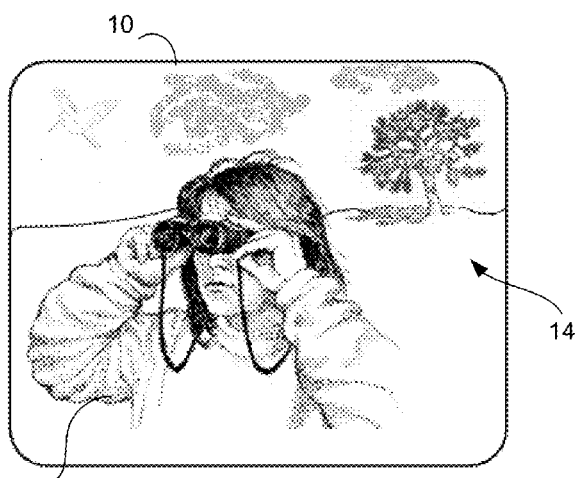
FIG. 1C illustrates an exemplary video frame of the subject of FIGS. 1A and 1B that has been enhanced in accordance with the present disclosure.

Upon identifying the pixels from each sub-frame that have the highest luminance, the primary frame 10 is constructed from the pixels flagged in each sub-frame (i.e., the pixels having the higher luminance) as shown in FIG. 1C. Thus, the primary frame 10 may be formed from some pixels of the first sub-frame 10a, and some pixels of the second sub-frame 10b. For example, the foreground pixels 12 of primary frame 10 may comprise the foreground pixels 12b of the second sub-frame 10b (which was obtained using the auxiliary light) and the background pixels 14 of the primary frame 10 may comprise the background pixels 14a of the first sub-frame 10a (which was obtained without using the auxiliary light). In this manner, each video frame is enhanced.

Figure 3:
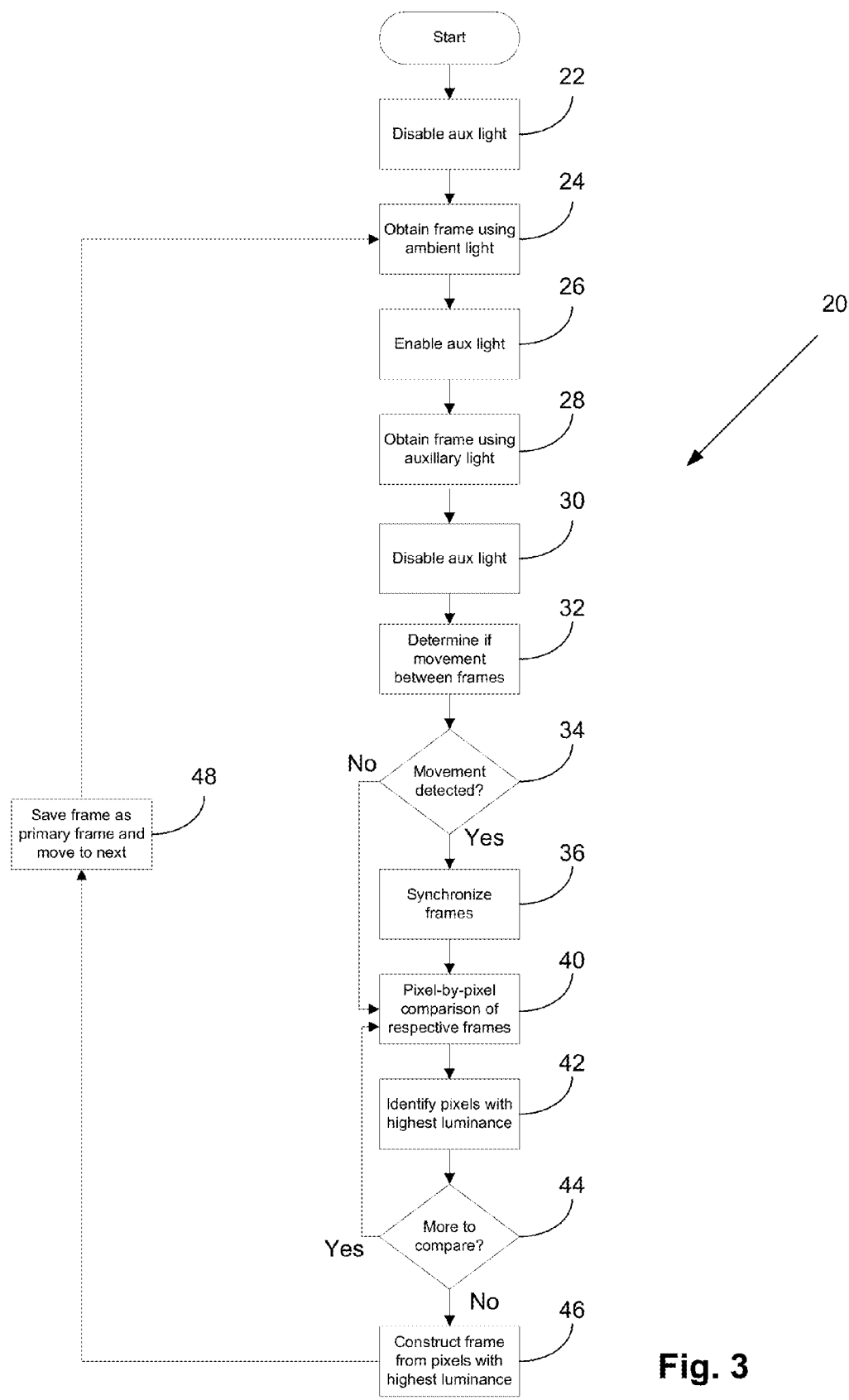
FIG. 3 is a flow chart illustrating an exemplary method of generating an enhanced video captured in accordance with the present disclosure.

Referring now to FIG. 3, illustrated is a flow diagram that depicts an exemplary method of enhancing video capture in accordance with the present disclosure. Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted.

The exemplary method of FIG. 3 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed by an electronic device. In one embodiment, to carry out the method, the logical instructions embodying the method are executed by a processor of the electronic device. Alternatively, the method may be at least partially implemented in hardware of the electronic device (e.g., an application-specific integrated circuit (ASIC) or the like).

The method may begin at step 22, where the auxiliary light source is disabled. In other words, the auxiliary light source is turned off such that only ambient light in the local environment is present. Next at step 24 video data for a first sub-frame 10a is obtained for an object of interest (e.g., a person, pet, scenery, event, etc.) using the available ambient light. Upon capturing the first sub-frame 10a, it may be temporarily stored (e.g., in memory) for processing of the primary frame.

Next at step 26 the auxiliary light source is enabled, i.e., it is turned on. Therefore, in addition to the ambient light in the local environment, additional light is available for image capture. At step 28, the second sub-frame 10b for the object of interest is captured while the auxiliary light source is enabled, and this second sub-frame may also be stored for later processing of the primary frame 10.

Since the auxiliary light source is enabled, image quality of at least the foreground objects as captured in the second sub-frame 10b is improved relative to the same objects captured in the first sub-frame 10a. However, and as noted above, image quality for background objects captured in the second sub-frame 10b may be of lower quality relative to same background objects captured in the first sub-frame 10a. The particular quality drop between the sub-frames can depend on a number of factors, including the available ambient light, the separation between the foreground objects and the background objects (the larger the spacing the more deterioration), the sensitivity of the sensor that captures the images, etc.

Next at step 30 the auxiliary light source is disabled, i.e., it is turned off. The period of time in which the auxiliary light source is turned on (step 26) and then turned off (step 30) is less than one half of the sample period for video capture. Thus, for example, if video is being captured at 60 fps (which due to using two sub-frames to create each primary frame would result in a final video of 30 fps), then the "on period" for the auxiliary light source is less than 8.3 ms (e.g., ½*⅟₆₀). More preferably, the time period is significantly less and may be on the order of 0.25 ms or less. An advantage of the short "on period" is that the human eye may not detect the on/off pulsing of the auxiliary light source.

Next at step 32 it is determined if there has been movement of the object of interest between capture of the first sub-frame 10a and capture of the second sub-frame 10b. A purpose of detecting movement is to determine if the second sub-frame 10b needs to be synchronized with the first sub-frame 10a. For example, in order to compare a pixel from the first sub-frame 10a to the corresponding pixel of the second sub-frame 10b, those two pixels should represent the same portion of the object being captured. If the object as captured in the second sub-frame 10b has moved since capture of the first sub-frame 10a, then it will be advantageous to determine the amount of such movement in order to perform an accurate comparison of the pixels corresponding to each other. In the event movement has been detected at step 34, then the method moves to step 36 where a synchronization process is performed so as to align/identify corresponding pixels from each sub-frame.

Various known methods exist for determining movement of an object between captured frames and synchronizing the respective objects in each frame. For example, the problem is well-studied from de-interlacing of interlaced video (such as analog TV or 1080i format HDTV signal), where two consecutive half-resolution frames are combined into a single full-resolution progressive frame. The state-of-the-art algorithms for de-interlacing already include object movement detection and compensation in order to better blend the frames together. The same motion detection and compensation algorithms used in state-of-the-art video de-interlacing can be used in the method described herein. It is noted that the step of combining two consecutive frames by doubling the number of lines as performed in the de-interlacing algorithms is omitted and instead the pixels are combined as described herein (e.g., pixels with the highest luminance are used to create the enhanced frame). Upon detecting movement and subsequently synchronizing the sub-frames, the method moves to step 40, which is discussed below.

Moving back to step 34, if movement is not detected between sub-frames, then the method bypasses step 36 and moves to step 40 where each pixel of the first sub-frame 10a is compared to the corresponding pixel of the second sub-frame 10b. For example, a first pixel of the first sub-frame 10a (e.g., pixel 0a, 0a) may be compared to a first pixel of the second sub-frame 10b (e.g., pixel 0b, 0b) to determine which pixel has the higher luminance. The pixel with the higher luminance then may be flagged as the optimal pixel as indicated at step 42, and then the next pixel of the first sub-frame 10a is compared to the corresponding pixel of the second sub-frame 10b. This process repeats until all (or substantially all) pixels of the respective sub-frames 10a and 10b have been compared, as indicated at step 44.

Alternatively, the pixels for the primary frame may be calculated based on a weighted combination of pixels from the two sub-frames (the weight factor may be equal or unequal). For example, an arithmetic average may be calculated based on pixels from the first sub-frame and the corresponding pixels from the second sub-frame. The arithmetic average, which may be based on luminance and chrominance of the respective pixels, would provide equal weighting between pixels of the first and second sub-frames. Additionally, the weighting factor can be varied such that pixels in one of the first sub-frame or the second sub-frame have more influence than pixels in the other of the first sub-frame or the second sub-frame. Such unequal weighting may be user selectable, for example, via a menu setting, slider bar, etc. on the electronic device.

Once the pixels from the first sub-frame 10a have been compared to the corresponding pixels of the second sub-frame 10b, the method moves to step 46 where the enhanced primary frame 10 is constructed. More particularly, the pixels of the first sub-frame 10a that have been flagged as having a higher luminance than the corresponding pixels of the second sub-frame 10b are used to construct a first portion of the enhanced frame. Similarly, the pixels of the second sub-frame 10b that have been flagged as having a higher luminance that the corresponding pixels of the first sub-frame 10a are used to construct a second portion of the enhanced frame, where the first portion and the second portion form a complete frame. The method then moves to step 48 where the enhanced primary frame is stored as a primary frame 10, and the method moves back to step 24 and the process repeats for the next frame. This process continues in real time until the user completes the video capture process.

Figure 4:
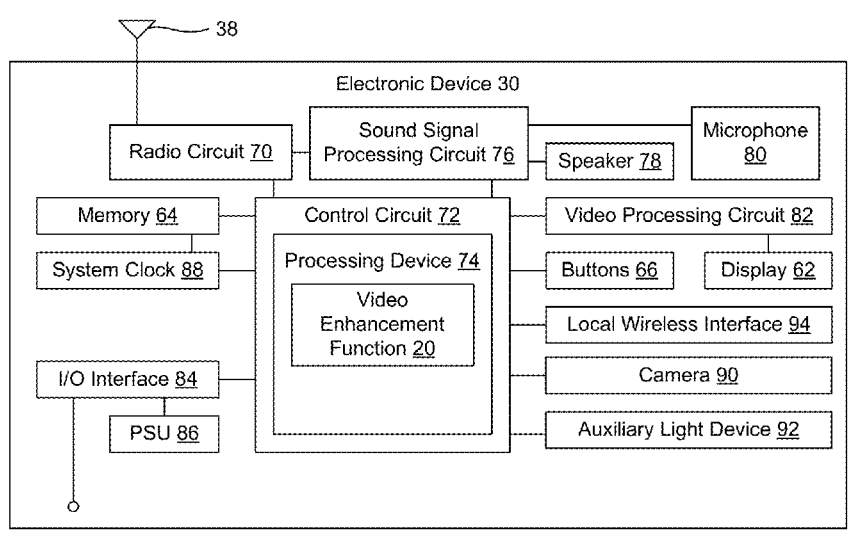
FIG. 4 is a schematic block diagram of an electronic device including a video enhancement function in accordance with the present disclosure.

The above-described method may be performed by an electronic device 60, an example of which in the form of a mobile phone is illustrated in FIG. 4. The electronic device 60 may be any type of electronic device in which it is desired to capture video of an object of interest, examples of which include a camera, smart watch, a gaming device, a communicator, a portable communication apparatus, a bracelet, visors, a phone, etc. It will be understood that certain features shown in FIG. 4 may not be included in all of the various types of electronic devices. For example, an electronic device embodied as a camera may not include circuitry for placing wireless telephone calls.

The electronic device 60 includes the video enhancement function 20 that is configured to generate enhanced video data as described with respect to FIGS. 1-3. The electronic device 60 may include a display 62. The display 62 displays information to a user such as operating state, time, telephone numbers, contact information, various menus, etc., that enable the user to utilize the various features of the electronic device 60. The display 62 also may be used to visually display content received by the electronic device 60 and/or retrieved from a memory 64 of the electronic device 60. The display 62 may be used to present images, video and other graphics to the user, such as photographs, mobile television content, Internet pages, and video associated with games.

Buttons 66 provide for a variety of user input operations. For example, the buttons 66 may include buttons for allowing entry of information, special function buttons (e.g., one or more of a call send and answer button, multimedia playback control buttons, a camera shutter button, etc.), navigation and select buttons or a pointing device, and so forth. Buttons or button-like functionality also may be embodied as a touch screen associated with the display 62.

Also, the display 62 and buttons 66 may be used in conjunction with one another to implement soft key functionality.

The electronic device 60 may include communications circuitry that enables the electronic device 60 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 30, including storing the data in the memory 64, executing applications to allow user interaction with the data, displaying video and/or image content associated with the data, outputting audio sounds associated with the data, and so forth.

In the exemplary embodiment, the communications circuitry may include an antenna 68 coupled to a radio circuit 70. The radio circuit 70 includes a radio frequency transmitter and receiver for transmitting and receiving signals via the antenna 68.

The radio circuit 70 may be configured to operate in a mobile communications system. Radio circuit 70 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 60 may be capable of communicating using more than one standard. Therefore, the antenna 68 and the radio circuit 70 may represent one or more than one radio transceiver.

The electronic device 60 may include a primary control circuit 72 that is configured to carry out overall control of the functions and operations of the electronic device 60. The control circuit 72 may include a processing device 74, such as a central processing unit (CPU), microcontroller or microprocessor. The processing device 74 executes code stored in a memory (not shown) within the control circuit 64 and/or in a separate memory, such as the memory 64, in order to carry out operation of the electronic device 60. For instance, the processing device 74 may execute code that implements the video enhancement function 20. The memory 64 may be, for example, one or more of a buffer, a flash memory, a hard drive, a removable media, a volatile memory, a non-volatile memory, a random access memory (RAM), or other suitable device. In a typical arrangement, the memory 64 may include a non-volatile memory for long term data storage and a volatile memory that functions as system memory for the control circuit 72. The memory 64 may exchange data with the control circuit 72 over a data bus. Accompanying control lines and an address bus between the memory 64 and the control circuit 72 also may be present.

The electronic device 60 may further include a sound signal processing circuit 76 for processing audio signals transmitted by and received from the radio circuit 70. Coupled to the sound processing circuit 76 are a speaker 78 and a microphone 80 that enable a user to listen and speak via the electronic device 60. The radio circuit 70 and sound processing circuit 74 are each coupled to the control circuit 72 so as to carry out overall operation. Audio data may be passed from the control circuit 72 to the sound signal processing circuit 76 for playback to the user. The audio data may include, for example, audio data from an audio file stored by the memory 64 and retrieved by the control circuit 72, or received audio data such as in the form of voice communications or streaming audio data from a mobile radio service. The sound processing circuit 74 may include any appropriate buffers, decoders, amplifiers and so forth.

The display 62 may be coupled to the control circuit 72 by a video processing circuit 82 that converts video data to a video signal used to drive the display 62. The video processing circuit 82 may include any appropriate buffers, decoders, video data processors and so forth. The video data may be generated by the control circuit 72, retrieved from a video file that is stored in the memory 64, derived from an incoming video data stream that is received by the radio circuit 70 or obtained by any other suitable method.

The electronic device 30 may further include one or more input/output (I/O) interface(s) 84. The I/O interface(s) 84 may include one or more electrical connectors. The I/O interfaces 84 may form one or more data ports for connecting the electronic device 60 to another device (e.g., a computer) or an accessory (e.g., a personal hands free (PHF) device) via a cable. Further, operating power may be received over the I/O interface(s) 54 and power to charge a battery of a power supply unit (PSU) 86 within the electronic device 60 may be received over the I/O interface(s) 84. The PSU 86 may supply power to operate the electronic device 30 in the absence of an external power source.

The electronic device 60 also may include various other components. For instance, a system clock 88 may clock components such as the control circuit 72 and the memory 64. A camera 90 is present for taking digital pictures and/or movies, and an auxiliary light device 92 (e.g., an LED light or the like that can be pulsed on and off). Image and/or video files corresponding to the pictures and/or movies may be stored in the memory 64. A local wireless interface 94, such as an infrared transceiver and/or an RF transceiver (e.g., a Bluetooth chipset) may be used to establish communication with a nearby device, such as an accessory (e.g., a PHF device), another mobile radio terminal, a computer or another device.

Although certain embodiments have been shown and described, it is understood that equivalents and modifications falling within the scope of the appended claims will occur to others who are skilled in the art upon the reading and understanding of this specification.

What is claimed is:

1. A method of capturing a video frame using an electronic device, comprising:
    capturing a first sub-frame using ambient light;
    capturing a second sub-frame using ambient light and a
        light source under control of the electronic device; and generating a primary frame based on a combination of the first sub-frame and the second sub-frame, said generating including comparing, on a pixel-by-pixel basis, pixels of the first sub-frame with corresponding pixels of the second sub-frame;

for each comparison, flagging one of a pixel of the first sub-frame or a pixel of the second sub-frame that satisfies a predefined characteristic; and using the pixels flagged in the first sub-frame and the pixels flagged in the second sub-frame to generate the primary frame.

2. The method according to claim 1, wherein generating includes using data from both the first sub-frame and the second sub-frame to generate the primary frame.

3. The method according to claim 1, where the predefined characteristic comprises a highest luminance level.

4. The method according to claim 1, wherein the predefined characteristic comprises a luminance level or a chrominance level.

5. The method according to claim 1, further comprising prior to the generating step synchronizing the second sub-frame with the first sub-frame.

6. The method according to claim 5, wherein synchronizing comprises detecting motion of an object captured in the second sub-frame relative to the object captured in the first sub-frame, and modifying the second sub-frame to compensate for the detected motion.

7. The method according to claim 1, wherein capturing the second sub-frame comprises pulsing a light source of the electronic device.

8. The method according to claim 1, further comprising repeating the steps of claim 1 for each successive primary frame.

9. An electronic device, comprising:
a camera;
a light source; and
a control circuit operative to generate a video, the control circuit configured to
capture a first sub-frame using ambient light,
capture a second sub-frame using ambient light and the light source of the electronic device, and
generate a primary frame based on a combination of the first sub-frame and the second sub-frame, wherein to generate the primary frame the control circuit is configured to
compare, on a pixel-by-pixel basis, pixels of the first sub-frame with corresponding pixels of the second sub-frame;
for each comparison, flag one of a pixel of the first sub-frame or a pixel of the second sub-frame that satisfies a predefined characteristic; and
use the pixels flagged in the first sub-frame and the pixels flagged in the second sub-frame to generate the primary frame.

10. The electronic device according to claim 9, wherein the electronic device comprises one of a camera, a mobile phone, a personal data assistance, a tablet computer, or a laptop computer.

11. The electronic device according to claim 9, wherein the predefined characteristic comprises a highest luminance level.

12. The electronic device according to claim 9, wherein the predefined characteristic comprises one of the highest luminance level or the highest chrominance level.

13. The electronic device according to claim 9, wherein the control circuit is configured to synchronize the second sub-frame with the first sub-frame prior to performing the comparison.

14. The electronic device according to claim 13, wherein the control circuit is configured to synchronize the second sub-frame to the first sub frame by detecting motion of an object captured in the second sub-frame relative to the object captured in the first sub-frame, and modify the second sub-frame to compensate for the detected motion.

15. The electronic device according to claim 9, wherein the control circuit is configured to pulse the light source at a prescribed frequency.

16. The electronic device according to claim 9, wherein the control circuit is configured to generate a video file from a plurality of primary frames.

* * * * *